(12) United States Patent
Doss et al.

(10) Patent No.: US 7,318,040 B2
(45) Date of Patent: Jan. 8, 2008

(54) PREDICTING AND ADJUSTING USERS' WORKING HOURS AND ELECTRONIC CALENDAR EVENTS

(75) Inventors: J. Smith Doss, Raleigh, NC (US); Renee M. Kovales, Cary, NC (US); Diane P. Pozefsky, Chapel Hill, NC (US); Robert J. Sundstrom, Cary, NC (US)

(73) Assignee: International Business Machines Corporation, Armonk, NY (US)

( * ) Notice: Subject to any disclaimer, the term of this patent is extended or adjusted under 35 U.S.C. 154(b) by 1232 days.

(21) Appl. No.: 10/245,200

(22) Filed: Sep. 17, 2002

(65) Prior Publication Data

US 2004/0064585 A1     Apr. 1, 2004

(51) Int. Cl.
*G06Q 90/00* (2006.01)
(52) U.S. Cl. .............................. 705/9; 705/7
(58) Field of Classification Search ..... 705/9
See application file for complete search history.

(56) References Cited

U.S. PATENT DOCUMENTS

| | | | |
|---|---|---|---|
| 5,899,979 A | 5/1999 | Miller et al. | |
| 6,101,480 A * | 8/2000 | Conmy et al. | 705/9 |
| 2001/0042001 A1 | 11/2001 | Goto et al. | |
| 2001/0049617 A1 * | 12/2001 | Berenson et al. | 705/8 |
| 2002/0131565 A1 * | 9/2002 | Scheuring et al. | 379/88.19 |
| 2003/0154116 A1 * | 8/2003 | Lofton | 705/8 |
| 2003/0182394 A1 | 9/2003 | Ryngler et al. | |
| 2004/0109025 A1 | 6/2004 | Hullot et al. | |

FOREIGN PATENT DOCUMENTS

WO    WO 00/67436    * 11/2000

OTHER PUBLICATIONS

Russell Information Sciences brings the first real-time scheduling solution to the World Wide Web, May 19, 1997, Business Wire, p. 05191091 [Dialog File 16].*
Vallancourt, Sue, Russell Information Sciences announces Calendar Manager® Version 5.0 for Macintosh, Jun. 5, 1995, PR Newswire, Section 1, p. 1.*

* cited by examiner

*Primary Examiner*—James P. Trammell
*Assistant Examiner*—Andre Boyce
(74) *Attorney, Agent, or Firm*—Marcia L. Doubet; Andre M. Gibbs (57) ABSTRACT

Techniques are disclosed for predicting and adjusting future working hours and calendar events for users of electronic calendars. Predictions may be made based on historical calendar data (e.g., a user's scheduled working hours/events and that user's actual working hours/events); based on updates to working hours or events; and/or based on external information. Rules are used in preferred embodiments to indicate the actions that should be taken when a particular condition occurs.

10 Claims, 6 Drawing Sheets

FIG. 6

PREDICTING AND ADJUSTING USERS' WORKING HOURS AND ELECTRONIC CALENDAR EVENTS

RELATED INVENTIONS

The present invention is related to the following commonly-assigned U.S. Pat.: U.S. Pat. No. 6,988,128, titled "Calendar Events and Calendar-Driven Application Technique" (Ser. No. 09/670,844); U.S. Pat. No. 6,640,230, titled "Calendar-Driven Application Technique for Preparing Responses to Incoming Events" (Ser. No. 09/671,001); U.S. Pat. No. 7,035,865, titled "Calendar-Enhanced Awareness for Instant Messaging Systems and Electronic Status Boards" (Ser. No. 09/941,045); U.S. patent application Ser. No. 10/245,156 (filed concurrently herewith), titled "Keeping Working Hours and Calendar Entries Up-to-Date"; and U.S. patent application Ser. No. 10/245,174 (filed concurrently herewith), titled "Context Conflict Resolution and Automatic Context Source Maintenance". The disclosures of these related inventions are hereby incorporated herein by reference.

BACKGROUND OF THE INVENTION

1. Field of the Invention

The present invention relates to computer systems, and deals more particularly with methods, systems, and computer program products for programmatically predicting and adjusting users' working hours and calendar events for electronic calendar systems.

2. Description of the Related Art

Calendars, and electronic calendars in particular, often contain a wealth of information about their owner. For example, an individual may use an electronic calendar to maintain information about his work schedule, his meetings and other appointments, his vacation and business travel plans (including when he will be away, which flights or other transportation he will use, where he can be reached while away, who he may visit while away, etc.), phone calls that need to be made at particular times, and so forth. Examples of electronic calendar systems include Microsoft Outlook® 2000 and Lotus Notes®. ("Outlook" is a registered trademark of Microsoft Corporation, and "Lotus Notes" is a registered trademark of Lotus Development Corporation.)

Electronic calendars may be accessed by people and/or by applications. Calendar data can be used to automate tasks and to inform others about things such as whether the calendar owner is currently available, or is out of the office on business, and so forth. For example, the related invention titled "Calendar Events and Calendar-Driven Application Technique" (U. S. Pat. No. 6,988,128) uses calendar data to automate voice mail greetings, among other things. It does this by analyzing calendar data, including a person's scheduled working hours and other scheduled events. The related invention titled "Calendar-Enhanced Awareness for Instant Messaging Systems and Electronic Status Boards" (U.S. Pat. No. 7,035,865) discloses techniques whereby calendar data is used as input to instant messaging ("IM") systems and electronic status boards. With the increasing use of calendar data, such as disclosed in these related inventions, it becomes more important to keep calendar data up-to-date and accurate.

In today's working environment, many employees are allowed to have a flexible working schedule. Some employees may choose to arrive much earlier than a conventional work day, in order to leave earlier. For example, Mary might start work at 6 a.m. so she can leave by 2:30 p.m. to pick up her children from school. Or, other employees might choose to arrive later in the morning and then work into the evening, perhaps to avoid traffic congestion. Some organizations with flexible working hours (commonly referred to as "flextime") allow employees to work several longer-than-conventional days, and then have a short work day—or to take a day off during the conventional work week. Fred, for example, might work from 8 a.m. to 5:30 p.m. Monday through Thursday, and then only from 8 a.m. to noon on Friday, so he can play golf in the afternoon. because their times will appear to be "random" to the calendar system. Thus, Marilyn has to go through a very repetitive, time-consuming process of adding each meeting.

In days past, it was the responsibility of a human administrative assistant or secretary to tend to employees' calendars, taking care of these types of erratic work schedules and other schedule variations. Very few employees have this luxury today, however, and instead are responsible for maintaining their own schedules using electronic calendars. When an employee has to manually update his electronic calendar for every variation in his working hours and the meetings and other events that occupy those working hours, it is likely that some updates will not be made. As a result, accesses to the employee's calendar data will provide incorrect information about his availability. Accesses may be made by individuals and/or by applications. For example, suppose Ellen is attempting to schedule a department meeting with all of her co-workers, and accesses their electronic calendars to see when they will be in the office. If some department members do not have correct information on their calendars, Ellen might have to repeat the scheduling process when she learns that someone cannot actually attend. This process might take several attempts, wasting a considerable amount of time and effort. Even if the scheduling process is performed by an automated process (such as a scheduling utility), efficiency and accuracy are reduced when the electronic calendar data with which this process operates is not accurate.

With reference to the related invention titled "Calendar Events and Calendar-Driven Application Technique" (U.S. Pat. No. 6,988,128), if an automated voice mail system according to this related invention takes an incoming call to an employee's phone number and uses that employee's inaccurate calendar data to generate a message for the caller, the caller will be incorrectly informed as to the employee's availability. In some cases, this is merely a nuisance. On the other hand, if someone needs to locate the employee for an important business matter or for a personal emergency, the incorrect information can have significant consequences.

In general, when an electronic calendar user's actual schedule does not conform to the information that has been provided to the calendar system, individuals looking at the calendar can be misled and applications that rely on calendar data for input cannot function optimally. Accordingly, what is needed are improvements that enable calendar data to more accurately reflect a user's working hours and scheduled events.

SUMMARY OF THE INVENTION

An object of the present invention is to provide improved techniques for keeping calendar data accurate based on predictions about a calendar user's working hours and/or calendar events.

An additional object of the present invention is to provide techniques for programmatically adding, deleting, and/or changing calendar entries and/or working hours to keep a user's calendar data accurate based on predictions about a calendar user's working hours and/or calendar events.

Another object of the present invention is to provide techniques for adding, deleting, and/or changing a user's working hours and/or scheduled events based on analyzing historical data.

Still another object of the present invention is to provide techniques for adding, deleting, and/or changing a user's working hours and/or scheduled events based on updates to scheduled working hours or events.

A further object of the present invention is to provide techniques for adjusting a user's working hours and/or scheduled events based on analyzing information external to the calendar.

Yet another object of the present invention is to make electronic calendars more useful.

A further object of the present invention is to increase the accuracy of information available from electronic calendars.

Other objects and advantages of the present invention will be set forth in part in the description and in the drawings that follow and, in part, will be obvious from the description or may be learned by practice of the invention.

To achieve the foregoing objects, and in accordance with the purpose of the invention as broadly described herein, the present invention provides systems, methods, and computer program products for programmatically adjusting electronic calendars. In one aspect, this technique comprises: programmatically adjusting working hours by analyzing historical calendar data for a calendar user to determine patterns in the user's working hours and programmatically adjusting the user's scheduled working hours for one or more dates based on the patterns. The analysis preferably further comprises comparing the user's scheduled working hours to his actual working hours, the patterns preferably comprise discrepancies between the scheduled working hours and the actual working hours. Rules are preferably used in the analysis and programmatic adjustments. Optionally, the programmatic adjustments are only made if the user confirms them. The programmatic adjustments may comprise one or more of: adding scheduled working hours to the user's calendar; deleting scheduled working hours from the user's calendar; or updating scheduled working hours on the user's calendar.

In another aspect, this technique comprises programmatically adjusting calendar events by analyzing historical calendar data for a calendar user to determine patterns in the user's calendar events and programmatically adjusting one or more of the user's scheduled calendar events based on the patterns. The analysis preferably further comprises comparing the calendar user's scheduled calendar events to his actual calendar events, and the patterns preferably comprise discrepancies between the scheduled calendar events and the actual calendar events. Rules are preferably used in the analysis and programmatic adjustments. Optionally, the programmatic adjustments are only made if the user confirms them. The programmatic adjustments may comprise one or more of: adding a calendar event to the user's calendar; deleting a calendar event from the user's calendar; or updating an event on the user's calendar.

In yet another aspect, this technique comprises programmatically adjusting electronic calendars by detecting an update to working hours or scheduled events on an electronic calendar, and programmatically adjusting the electronic calendar, responsive to the detected update. The detected update may comprise one (or more) of: an event added to the calendar, an event deleted from the calendar, an event changed on the calendar, scheduled working hours added to the calendar, scheduled working hours deleted from the calendar, or scheduled working hours changed on the calendar. The programmatic adjustment preferably further comprises adding one or more events to the calendar, deleting one or more events from the calendar, and/or changing one or more events on the calendar, or adding, changing, and/or deleting scheduled working hours. Rules are preferably used in the programmatic adjustments. Optionally, the programmatic adjustments are only made if the user confirms them.

In still another aspect, this technique comprises programmatically adjusting calendar events by receiving input from one or more sources external to a user's electronic calendar; comparing the received input to rules and/or a user's scheduled calendar events; and programmatically adjusting one or more of the scheduled events, in response to the comparison. The programmatic adjustment may further comprise adding an event to the calendar, deleting an event from the calendar, or changing an event on the calendar. Rules are preferably used in the programmatic adjustments. The received input may be a notification from an external data source.

In a further aspect, this technique comprises programmatically adjusting working hours on electronic calendars by receiving input from one or more sources external to a user's electronic calendar; comparing the received input to rules and/or a user's scheduled working hours; and programmatically adjusting the user's scheduled working hours for one or more dates, in response to the comparison. Rules are preferably used in the programmatic adjustments. The received input may be a notification from an external data source.

Techniques of the present invention may also be used advantageously in various methods of doing business. For example, a calendar system providing the advantageous features disclosed herein may be marketed to users under various revenue models, including monthly subscriptions (or other periodic subscriptions), pay-per-use, etc.

The present invention will now be described with reference to the following drawings, in which like reference numbers denote the same element throughout.

DESCRIPTION OF PREFERRED EMBODIMENTS

The present invention defines improved techniques for use with electronic calendar systems, whereby calendar data will more accurately reflect a user's working hours and scheduled events. In addition to providing information about a calendar user's scheduled activities for the current day, electronic calendar data is useful for other purposes: one is to predict the future (e.g., showing where the user will be on a particular day) and another is to record the past (e.g., to determine how many hours a department's employees spent in meetings for a given time period).

According to preferred embodiments of the present invention, predictions about working hours and/or scheduled events are made using one or more of the following input types: (1) historical data about the user's working hours and/or calendar events; (2) updates to the user's working hours and/or calendar events; and (3) information external to the user's calendar. These predictions may be used to programmatically adjust the user's working hours; to add, delete, or change events on the user's calendar; or a combination thereof. For example, suppose that Carla adds a lunch event to her calendar, starting at the current time, and specifies that she is going to lunch at Chez Pierre. Because she's in a hurry to leave, Carla does not bother to specify an ending time for her lunch, so her default lunch duration of 30 minutes is used. However, Carla always takes at least 2 hours when she goes to Chez Pierre. Using the present invention, Carla's historical calendar data can be analyzed, and instead of using the default duration, her return time can be set to more accurately reflect when she will return.

The user may be prompted for input before calendar adjustments are made, and may be allowed to confirm or reject impending updates. Rules are preferably used during the analysis process, as will be described. A set of rules that is applicable to all users or groups of users within an organization may be used, and in preferred embodiments, individual users are also allowed to specify rules.

Rule-based systems are known in the art. Using rules to predict and adjust current or future working hours and calendar events, as disclosed herein, is not known. The detailed workings of these rule-based systems are not within the scope of the present invention; rather, the present invention discloses using rules to make updates to a user's calendar data or to initiate a task. The rules may be obtained from a general set of rules defined for the system, and/or rules that are defined by an administrator and/or by users. The rules may be applied to all users, groups of users, or to individual users. The rules may be maintained via a graphical user interface ("GUI") or any other appropriate means for adding, deleting, and/or changing rules. In preferred embodiments, the GUI displays not only the user's applicable rules, but also rules that have been proposed by the system (as will be described with reference to FIG. 3) but have been rejected by the user. In preferred embodiments, the rule-based system validates all rules to ensure that they are not conflicting.

Example scenarios in which rules are used to assist a user in maintaining accurate calendar data will now be described.

EXAMPLE

Deleting Events from the Calendar

Pete has his calendar set up so that all meeting invitations are automatically accepted, causing the meeting to be scheduled on his calendar. Pete has set up a rule stating that whenever a meeting with topic "brainstorming session" is scheduled for a Monday morning before 10 a.m., the meeting should be deleted from his calendar. Based on this rule, any meetings with this topic that are scheduled for future Monday mornings before 10 a.m. can be automatically deleted from Pete's calendar. (Pete may optionally set up his rules so that he will be queried before the automatic deletion occurs.) By deleting these meetings, Pete's calendar will be more accurate and others can schedule meetings on other topics for that time. A rule similar to the following produces the desired results:

If a meeting with the topic of "brainstorming session" is scheduled before 10 a.m. on Monday, then delete the calendar entry.

EXAMPLE

Updating Working Hours Based on an Event

Suppose that Janet has defined her working hours as 8 a.m. to 5 p.m. Monday through Friday, but that she receives a meeting notice for a meeting that is scheduled from 5 p.m. to 7 p.m. on Thursday. Since this event is outside of Janet's scheduled working hours, the analyzer disclosed herein determines, based on rules Janet defined, to update Janet's working hours for Thursday to 8 a.m. to 7 p.m. Janet therefore does not have to manually revise her scheduled working hours, and individuals or applications consulting her calendar will be informed that she will be working until 7 p.m. on Thursday, and that she will be in a meeting starting at 5 p.m.

If the meeting is subsequently re-scheduled or cancelled, then the analyzer disclosed herein automatically updates Janet's working hours for that Thursday to her originally-scheduled 8 a.m. to 5 p.m.

Rules similar to the following produce the desired results:
If a meeting is scheduled and (1) its start time is either during my working hours or within 30 minutes of my ending work hour and (2) the meeting extends beyond my ending work hour, then extend my scheduled working hours to include the meeting.
If a meeting is rescheduled or cancelled and that meeting changed my scheduled working hours, then change my working hours back to the originally-scheduled working hours.

Example rules that may be used for predictions based on historical data include:
If a discrepancy in working hours of more than 15 minutes is identified, query the user before making an adjustment. (This type of information might be used as a general rule that is applicable to all users, or it might alternatively be specified as a user preference. In this manner, minor day-to-day variations in a person's arrival or departure time would be ignored by the analyzer described herein.)
If the difference between the specified starting work hour and the actual starting work hour is greater than half an hour, and this difference has occurred for three or more weeks, then adjust the user's working hours. (A similar rule might be defined for the ending work hours.)
If working hours are to be extended for a Friday, do not extend the ending work hour beyond 5 p.m.
If lunch events consistently start within a 10-minute range and if sufficient free time is on the calendar, automatically add a lunch event to the calendar, using the midpoint of the range as the starting time of the lunch event.
If a pattern for a particular event type is detected, query me about whether I would like my calendar updated for future events of this type.
If I schedule a lunch event with the default duration, then automatically update the ending time based on history (i.e., the user's normal lunch event duration),
If a user schedules a lunch event with the default duration and specifies the restaurant name, then automatically update the ending time, based on the restaurant name and the user's normal lunch event duration when going to that restaurant.

Using the techniques disclosed herein, electronic calendar users are able to keep accurate working hours and scheduled events on their calendars much more easily and efficiently, without having to make manual event-by-event or day-byday changes. Because programmatic means are used, as disclosed herein, it is much more likely that the user's calendar will accurately reflect his working hours and events. This improved accuracy will be of benefit to other users viewing the user's calendar as well as to other systems that analyze or use calendar data.

The term "calendar data", as used herein, refers to information of the type used by electronic calendars. In preferred embodiments, this information comprises calendar entries (referred to equivalently herein as "calendar events") as well as other information such as user profiles and user preferences. User preferences may be used to indicate how a particular calendar owner's calendar entries should be interpreted, such as the user's preferred mode of contact (e.g., by phone, by pager, etc.) during various types of scheduled events, how often the user checks voice mail, and so forth. User profiles store information such as the calendar owner's working hours, the default time zone to be applied to the user's calendar, and optional profile-specific preferences (such as a pager number with which a user can be contacted during the working hours defined in the particular profile).

The term "update" or "updating", when used herein to refer to calendar data for a user's calendar, includes making additions, deletions, and/or changes to the calendar data.

Use of user profiles that store working hours information for each user is disclosed in the related invention titled "Keeping Working Hours and Calendar Entries Up-to-Date". This invention (referred to hereinafter as "the related invention") discloses techniques whereby calendar users can easily update working hours and/or events on their calendar, for example by pressing a button on a GUI or by signaling a working hours change from any input device. Techniques are also disclosed whereby one or more application programs (such as an instant messaging application) may communicate information about the user's status or a change in the user's status (including the user's presence or absence), and this status information can be used to programmatically update the user's working hours and/or scheduled events. (This status information may equivalently be obtained from a server or service that receives information from such application programs, as discussed in the related invention. References herein to receiving the status information from an application are therefore by way of illustration but not of limitation.)

According to preferred embodiments of the related invention, each user may have one or more profiles. In a particular profile, multiple sets of working hours may be specified for each day (such as 7 a.m. to 11 a.m. and 12 noon to 4 p.m. on Thursdays), and different sets of working hours may be specified for different days (such as 7 a.m. to 11 a.m. and 12 noon to 4 p.m. on Tuesdays, 6 a.m. to 12 noon on Wednesdays, and 12 noon to 6 p.m. on Thursdays). A user can then select which profile is currently active, thereby quickly changing his scheduled working hours. (Refer to the related invention for more detailed information about user profiles, including how they can be used to conveniently isolate information that applies only to a particular set of working hours.)

Using the techniques of the related invention, historical calendar data is available for calendar users that includes actual working hours and events, and scheduled working hours and events. Preferred embodiments of the related invention also store other historical information such as user preferences. Refer to the related invention for more information on stored data.

Preferred embodiments of the present invention use this historical calendar data, and/or updates to the user's calendar (i.e., additions, deletions, or changes to scheduled working hours and/or calendar events) and/or information that is external to the calendar system, to predict how a calendar user will schedule his time. An embodiment of the present invention then programmatically updates the user's calendar.

Rules may be used, according to preferred embodiments, to update calendar data; and/or to initiate a task, which could include querying the user for input, starting a timer, starting another process. The process used in preferred embodiments comprises obtaining the data from external sources (such as those described below with reference to FIG. 1) and from calendars; analyzing this information in accordance with the rules; and applying the rules when appropriate. In preferred embodiments, the rules are applied when the calendar data is updated, when the rules are updated, after analysis of the historical data, and on receipt of external information. In an alternative embodiment, the rules are applied on a periodic basis. When rules are applied periodically, different sets of the rules may be applied on the same schedule or on different schedules to improve performance. For example, a given set of rules may be applied only once per week while others are applied hourly.

The manner in which preferred embodiments of the present invention operate will now be described with reference to FIGS. 1-6.

Figure 1:
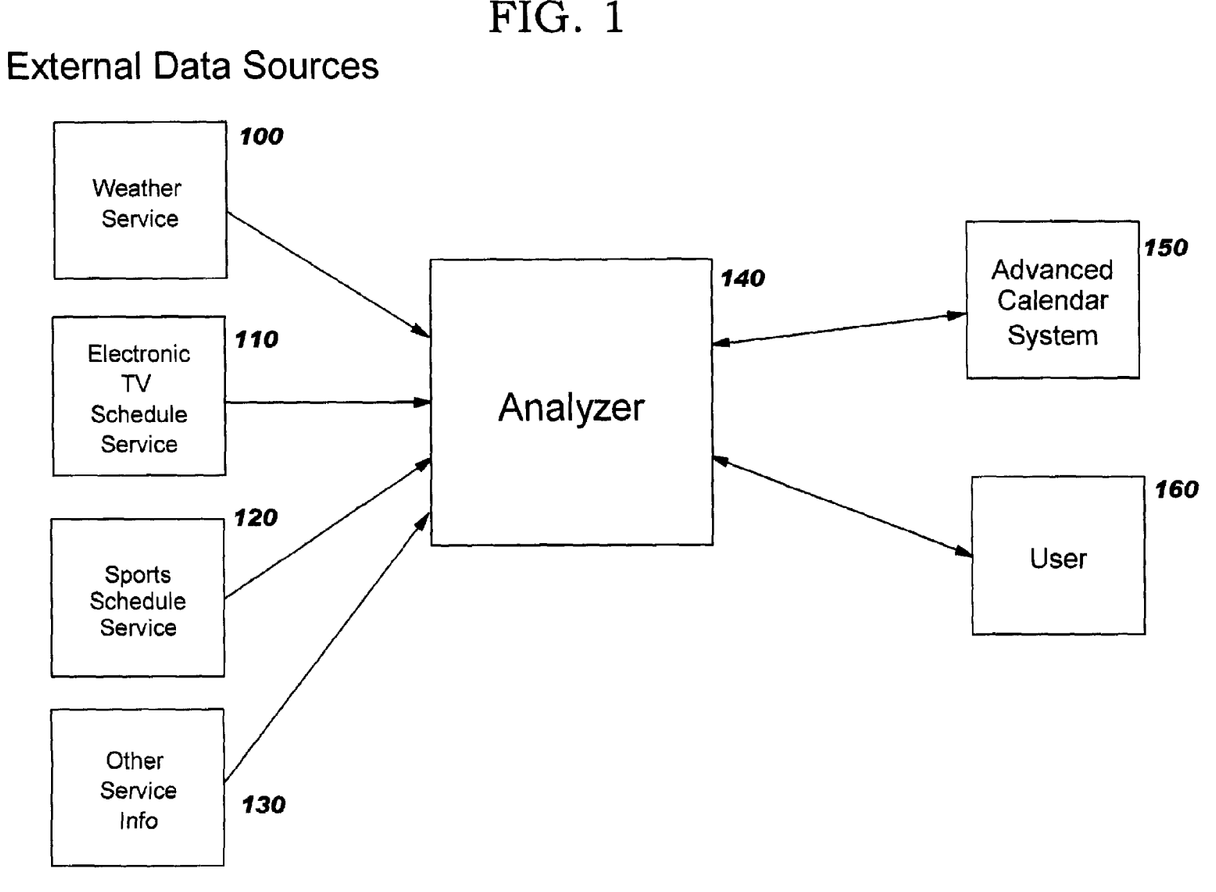
FIG. 1 provides a high-level overview of components that may be used by preferred embodiments of the present invention.

An overview of components used in preferred embodiments is provided in FIG. 1. One or more external data sources (i.e., sources of information other than the user's calendar) may provide input to an analyzer component 140 for use in predicting a user's schedule. Representative external data sources include a weather service 100, an electronic television ("TV") schedule service 110, and a sports schedule service (or a sports feed) 120. One or more other services 130 might be used in addition to, or instead of, weather service 100, TV schedule service 110, and/or sports schedule service 120.

An embodiment of the present invention may operate as part of a calendar system, or independently from the calendar system. FIG. 1 illustrates the latter scenario, where analyzer 140 is a separate component from advanced calendar system 150. Analyzer 140 obtains calendar data, including historical data as well as future calendar data, from an advanced calendar system 150. User preferences typically come from the advanced calendar system 150 as well. In preferred embodiments, the advanced calendar system disclosed in the related invention is used. (In alternative embodiments where this advanced calendar system is not used, then the historical data may be retrieved from a location other than the calendar.) Preferred embodiments use a set of rules when making predictions for a user's working hours and/or calendar events, and these rules are preferably part of the analyzer 140. (In alternative embodiments, one or more of these types of information may be stored as part of a different component, or in a separate repository accessed by the analyzer and/or advanced calendar system, without deviating from the inventive concepts disclosed herein.) Information for use in updating future calendar data may be sent from analyzer 140 to advanced calendar system 150. Input to the analyzer may also be received from a calendar user 160, and information may be communicated from the analyzer to the calendar user. (Note that there is not necessarily a one-to-one correspondence between the analyzer 140 and the advanced calendar system 150.)

While preferred embodiments are described herein with reference to using information from an advanced calendar system, this advanced calendar system is not a required part of the present invention. For example, if a calendar system is used that does not include functions as described in the related inventions, then functions disclosed therein (such as flexibly updating working hours and storing of actual calendar data) may not be available. (Note also that the historical data described herein is not strictly required for an implementation of the present invention, and therefore a calendar system that does not provide historical data may be used with an embodiment of the present invention.)

The predictions/adjustments made by analyzer 140 according to preferred embodiments of the present invention will be described first with reference to historical data, followed by a description of predictions/adjustments that arise from processing updates to working hours or calendar events, and use of information external to the calendar for predictions/adjustments will then be described. An embodiment of the present invention may perform one of these types of processing, or all three types, or some combination thereof. Following a discussion of these three types of processing, FIGS. 2-6 will be described, showing how an embodiment supporting a combination of these three types of processing may be implemented.

Predictions Based on Historical Calendar Data

Historical data can be used, according to preferred embodiments, to update working hours for current or future calendar dates and/or to add, delete, or change calendar events for current or future dates. For example, discrepancies between scheduled and actual working hours or patterns of particular meetings that are never attended can be identified. The process used in preferred embodiments comprises obtaining historical calendar data; analyzing this information; and looking for patterns. The details of the historical analysis may vary from one implementation to another, and preferred embodiments use analytical algorithms that are known in the art. The detailed workings of these algorithms are not within the scope of the present invention; rather, the present invention discloses using historical calendar data, and trends observed from that data, to make updates to a user's calendar.

As stated earlier, historical data may be obtained from a calendar system operating according to the related invention. Alternatively, historical calendar data may be obtained from another source, including an embodiment of the present invention that periodically stores the calendar data in a file (or other data store). The calendar data in this "history file" may be stored on a daily basis, for example, and data spanning a configurable period (such as 3 weeks, or 5 days, or 1 month, etc.) may be gathered in this history file. In either approach, the amount of calendar data that is stored and/or used by the analyzer is preferably configurable. Additionally, the frequency of obtaining the historical calendar data in either approach is also preferably configurable.

Preferably, the analysis of the data in the history file occurs periodically. This periodic analysis may be performed on a different schedule than the periodic storing of the calendar data, and preferably comprises comparing the user's scheduled working hours and scheduled calendar events to his actual working hours and calendar events, looking for variations. For example, the user's actual starting work hour may be compared to his scheduled starting time to see if trends can be observed. A plurality of comparisons may be made, as desired in a particular implementation. Thus, variations between the two starting times for all Mondays in the historical data might be computed, and similarly for all other days of the week; or, in a large sample of historical data, month-by-month variations might be analyzed. Many different examples may be envisaged once the teachings disclosed herein are known; several example scenarios are provided below.

Alternatively, the periodic analysis might simply comprise evaluating actual working hours and calendar events to look for patterns (without a comparison to scheduled hours and events).

Once any patterns have been identified, preferred embodiments apply rules (and optionally, user preferences) to determine how to proceed. The actions that can be taken include updating calendar data and/or initiating a task (which may include querying the user for input, starting a timer, or starting another process).

Example scenarios in which this process operates to assist a user in maintaining accurate calendar data will now be described.

Example Scenario 1

Updating Working Hours with User Input

Suppose that Sally has defined her working hours as 7 a.m. to 5 p.m. Monday through Friday, but that an analysis of her historical calendar data shows that her actual working hours are 7:45 a.m. to 5 p.m. Monday through Thursday, and 7:45 a.m. to 4 p.m. on Fridays. Therefore, individuals or applications consulting Sally's calendar for scheduling future events will believe that Sally is available by 7 a.m. every day, and until 5 p.m. on Friday, even though this is not an accurate reflection of Sally's work habits.

Using the present invention to solve this problem, the analyzer component will use Sally's historical data to identify this discrepancy, and then based on a defined rule, Sally will be queried about whether she would like to change her "normal" working hours to align with the analyzer's prediction of what her typical working hours should be. Sally's positive response to the query will cause her working hours to be updated, resulting in a more accurate representation of her schedule. A negative response to the query will result in Sally's working hours remaining unchanged.

Example Scenario 2

Automatically Updating Working Hours

Mike frequently works a flexible schedule. He allows the calendar system, according to the present invention, to automatically adjust his scheduled working hours, based on predictions made by the analyzer as it reviews his historical calendar data (which includes Mike's actual working hours). On Fridays, however, Mike wants to maintain 5 p.m. as his ending work hour, even though he sometimes works later. This way, the automated meeting scheduler used in Mike's company (which uses scheduled working hours to set up meetings) will not schedule Mike to attend any meetings after 5 p.m. on Fridays. Mike creates one or more rules to prevent his Friday ending work hour from extending past his desired cutoff time, thus tailoring the system to meet his needs. A rule similar to the following produces the desired results:

If historical data indicates that working hours should be adjusted, then automatically adjust working hours on any day except for the ending working hour on Friday.

Example Scenario 3

Adding Events to the Calendar

Joe has an hour for lunch each day. He normally adds a lunch event to his calendar just prior to leaving for lunch, using techniques such as those disclosed in the related invention (e.g., via a "Lunch" button that is provided on a GUI). The analyzer of the present invention determines, by reviewing Joe's historical calendar data, that Joe always has lunch from noon to 1 p.m. on Mondays, and has lunch from approximately 11:30 a.m. to 12:30 p.m. all other days. Joe will be queried to see if he wants his calendar to be updated based on this prediction, with "lunch" events automatically added according to his past behavior patterns.

Example Scenario 4

Updating Working Hours for Business Events Only

Paul allows an implementation of the present invention to update his working hours automatically, based on its analysis of his historical calendar data. However, Paul does not want his working hours to be updated when his working hours vary because of personal events that he has scheduled. Paul defines rules so that the automated updates to his working hours will be made only for business-related events.

The distinction between business and personal events may be made in a number of ways. For example, Paul might explicitly classify events as personal, using a button on the GUI for the calendar system or other means. Paul can then define a rule that says "business events are those events not classified as personal". Or, Paul might define a rule that says "business events do not have the text "PERSONAL" or "PERS:" in the subject line". Event types may, in some cases, implicitly distinguish between personal and business events. That is, a calendar system might provide a choice for a "personal business" or similar event type. In this case, Paul can define a rule based on the event type.

Example rules that may be used for predictions based on historical data include:
- If a discrepancy in working hours of more than 15 minutes is identified, query the user before making an adjustment. (This type of information might be used as a general rule that is applicable to all users, or it might alternatively be specified as a user preference. In this manner, minor day-to-day variations in a person's arrival or departure time would be ignored by the analyzer described herein.)
- If the difference between the specified starting work hour and the actual starting work hour is greater than half an hour, and this difference has occurred for three or more weeks, then adjust the user's working hours. (A similar rule might be defined for the ending work hours.)
- If working hours are to be extended for a Friday, do not extend the ending work hour beyond 5 p.m.
- If lunch events consistently start within a 10-minute range and if sufficient free time is on the calendar, automatically add a lunch event to the calendar, using the midpoint of the range as the starting time of the lunch event.
- If a pattern for a particular event type is detected, query me about whether I would like my calendar updated for future events of this type.
- If I schedule a lunch event with the default duration, then automatically update the ending time based on history (i.e., the user's normal lunch event duration), If a user schedules a lunch event with the default duration and specifies the restaurant name, then automatically update the ending time, based on the restaurant name and the user's normal lunch event duration when going to that restaurant.

Predictions Based on Updates to Calendar Data

Updates to calendar data can be used, according to preferred embodiments, to add, delete, or change calendar events or working hours for current and future dates. The process used in preferred embodiments comprises detecting an update to a user's calendar data, applying rules to see if any defined actions should be taken, and then performing the action or actions. Actions may include updating calendar data and/or initiating a task (which may include querying the user for input, starting a timer, or starting another process).

Example scenarios in which this process operates will now be described.

Example Scenario 5

Adding Calendar Event Based on Addition of Another Event

Suppose that Marilyn's manager is located in the Boston branch of her company, and that whenever Marilyn schedules a business trip to Boston, she also schedules a meeting with her manager. Using the present invention, whenever Marilyn schedules a business trip to Boston, a meeting with the manager can be automatically scheduled. This saves Marilyn time, and also ensures that the meeting will be scheduled (assuming, of course, that a meeting scheduling process determines that Marilyn's manager has time available on his calendar). To do this, Marilyn sets up a rule similar to the following:
If a trip to Boston is added to the calendar, then:
  check for common free time on my calendar and my manager's calendar during the time frame of the trip;
  if common free time is found, schedule a 1-hour meeting.

Example Scenario 6

Adding Calendar Event Based on Working Hours Change

Suppose that Jim works part time, and that his scheduled working hours are from 8 a.m. to noon, Monday through Friday. Whenever Jim works a full day, he explicitly updates his working hours for that day to 8 a.m. to 5 p.m. Based on this change to his working hours and the rules that his organization has defined, the analyzer of the present invention will automatically add a 1-hour lunch break from 12:00 to 1:00 p.m. to Jim's calendar (using rules that either Jim or his organization defined for lunch break schedules).

Example rules that may be used for predictions based on updates to calendar data include:
- If a meeting is added to the calendar outside of the user's scheduled working hours, automatically extend the working hours to encompass the meeting.
- If a teleconference is added to the calendar outside of the user's scheduled working hours, and the starting time for the teleconference is 1 hour or more after the user's scheduled ending work time, then add another set of working hours to the calendar for the duration of the teleconference. (For example, instead of waiting at work for the teleconference to start, the user will call in from home or another non-work location.)

If an update to the user's scheduled working hours is identified, prompt the user before making the update.

If a customer meeting is scheduled on the calendar, then cancel any other meetings scheduled for that time.

Predictions Based on External Information

Input received from a source other than the user's calendar, referred to herein as "external information" or data from an external source, can also be used, according to preferred embodiments, to make updates to future working hours and/or to add, delete, or change calendar events for current and future dates.

The process used in preferred embodiments comprises monitoring the identified external source(s) on an ongoing or periodic basis, watching for the conditions specified by a user, and when a user-specified condition is detected, applying rules (and optionally, user preferences) to determine how to proceed. Alternatively, rather than monitoring the identified sources, the analyzer might subscribe to one or more services, where the service sends updates as they occur. When a user-specified condition is detected, the actions that can be taken include updating calendar data and/or initiating a task (which may include querying the user for input, starting a timer, or starting another process).

Example scenarios will now be described for using this approach.

Example Scenario 7

Updating Working Hours Based on Weather

Suppose that Glenn is an avid golfer, and that whenever the weather forecast is for a sunny day with temperatures over 75 degrees, Glenn adjusts his schedule so that he can leave early. In order to do this in the prior art, Glenn has to monitor the weather and explicitly change his working hours in advance (to prevent other events from being scheduled). According to the present invention, Glenn's calendar is automatically updated to block out the warm, sunny afternoons for his golf games. To do this, Glenn defines a rule such as "If the forecast for some day during the next 5 working days is for sunshine and with temperatures above 75 degrees, and I have nothing scheduled on my calendar from 3 p.m. until 7:30 p.m., then update my working hours for this day to 6:30 a.m. to 3 p.m.". Given this rule, the analyzer knows that it needs to process weather-related input for Glenn. If the analyzer determines that weather conditions are met and Glenn does not have any events on his calendar from 3 p.m. to 7:30 p.m. for the particular day, the analyzer will then update Glenn's calendar. Since Glenn wants to know when such an event is added to his calendar, he further defines the rule (or defines another rule) to send him a notification of his upcoming outing. Now Glenn saves time by not having to personally check the weather forecast, check his schedule, and then explicitly revise his working hours.

Example Scenario 8

Change Working Hours Based on Television Schedule

Suppose that Ted is a football fan, and watches every Monday night game. He uses his company's flex-time policy and arrives 1 hour later than normal for work the next day. The analyzer of the present invention is configured to access an electronic TV schedule service. The rule Ted defines for his football-watching habits is used by the analyzer to automatically adjust Ted's working hours for each affected Tuesday. The rule may also specify that the analyzer should process Ted's data whenever data from this external TV schedule service is available.

Examples of rules that may be used for predictions based on external information include:

If Carolina plays Duke in basketball during working hours, and the game is televised on local TV, schedule vacation time beginning 2 hours before the game starts.

If the weather forecast is for rain, and the user has a vacation day scheduled with the subject of "bicycling", then delete the vacation event from the user's calendar.

Example Scenario 9

Change Working Hours Based on Someone Else's Working Hours

Gina is an executive secretary. Being an excellent secretary, she ensures that she is at the office before her boss is scheduled to arrive, and remains at the office until after he leaves. Her boss works irregular hours, and his working hours are updated automatically by the analyzer. Gina doesn't have time to update her working hours whenever her boss' hours change, so she has created rules to do this. For example, Whenever my boss' working hours change, update my working hours such that my starting work hour is 20 minutes earlier than his and my ending work hour is 10 minutes later than his.

Preferably, a GUI screen (or other appropriate means) is provided with which a user can indicate the external event information to use for his calendar. Alternatively, this information might be derived by inspecting the rules applicable to the user. So, for example, if a user defines a rule that involves weather, the user may indicate that a source for weather information is required (or this may be derived from the fact that the user specified weather-related information in the rule). A person such as a systems administrator may then be responsible for identifying a particular location (such as a uniform resource locator, or "URL") from which weather information can be obtained and configuring the implementation to communicate with that location when necessary. (Alternatively, the user might be responsible for identifying the specific source of external information.) Or, an implementation of the present invention might have predefined sources from which a choice can be made.

Optionally, the user may specify (using the GUI, for example) sources from which rules can be derived. For example, if the user is already receiving notifications or information (such as weather alerts) from another service, he can specify that the rule-based system should use his subscription information. In this manner, the user is not required to type in more rules. As an example, suppose Doug has specified, in another service, that he wants to receive notifications of when a particular rock group will be playing in town. Preferably, when Doug configures his implementation of the present invention, he specifies this notification service as a source of external information. The present invention can then process this information and use it to help Doug manage his calendar. Then, if the analyzer disclosed herein determines that the rock group will be playing in town next month, Doug might be queried to determine whether he would like to adjust his calendar (e.g., to adjust his scheduled working hours so that he can leave early that day, and arrive late the following morning).

Predictions Based on Multiple Factors

In addition to making predictions based on the three factors that have been described (i.e., based on historical data, updates to calendar data, and external information), the analyzer may be adapted for combining factors. The analyzer in this case looks for correlations between factors, such as correlations between weather or sporting events and historical calendar data. When a correlation is detected, rules may be applied to update the user's working hours and/or calendar events. Optionally, the user may be prompted to accept or reject these updates. Or, the detected correlation might be presented to the user (e.g., via a message on a GUI), asking the user if he would like to add a rule to capture this correlation.

Example Scenario 10

Change Working Hours Based on Television Schedule and Historical Calendar Data

Suppose that, according to example scenario 8 above, Ted has defined a rule that tells his calendar system he will arrive at work 1 hour later than normal whenever there is an evening football game on TV. The analyzer also detects, based on an analysis of historical calendar data and the electronic TV schedule service, that Ted arrives later than normal whenever a baseball game was televised the night before. Ted may be queried to determine whether he would like to add a rule that automatically updates his working hours when televised baseball games are scheduled.

Logic which may be used to implement preferred embodiments will now be described with reference to FIGS. 2-6. (Note that while the logic in FIGS. 2-6 describes an implementation in which three types of factors are used, alternative embodiments may be provided that use some subset of these factors, and these alternative embodiments are within the scope of the present invention.)

Figure 2:
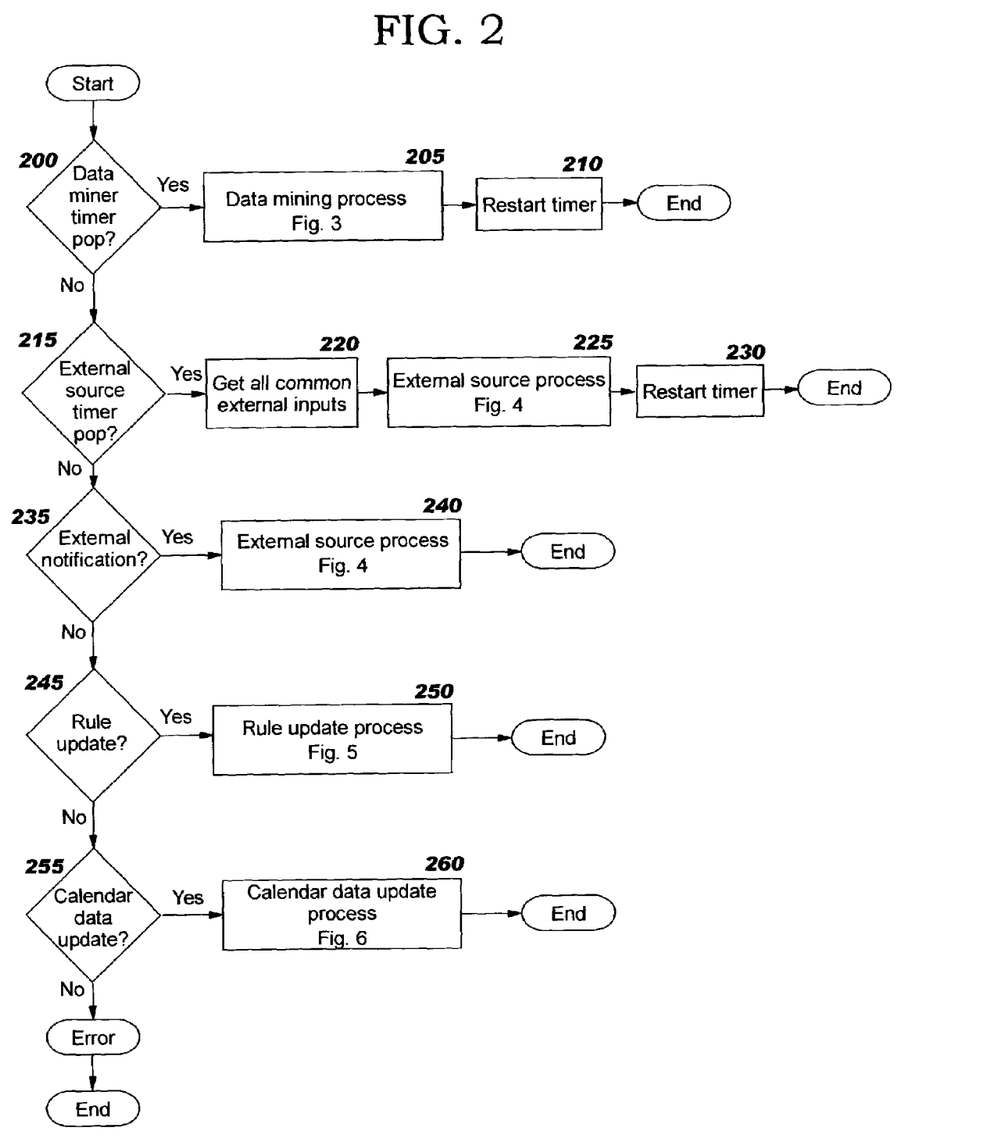
FIGS. 2-6 provide flowcharts illustrating logic that may be used when implementing preferred embodiments of the present invention.

Referring first to FIG. 2, a flowchart is provided depicting the overall processing logic that may be used for an implementation incorporating all of the techniques that are used to predict and update a user's calendar. Blocks 200, 215, 235, 245, and 255 indicate five possible events that trigger processing, and may be implemented as a switch. Block 200 checks whether a timer has popped indicating that a periodic data mining pass (Block 205) should be executed. The data mining pass examines the user's historical calendar data and any external sources that have been identified, looking for proposed rules and trends that it may discover. This process is defined in more detail in FIG. 3. Once the pass is completed, the timer is restarted (Block 210) and the processing for this iteration of FIG. 2 is complete.

Block 215 determines whether a timer has popped for evaluating external data sources for matches against the user's rules on future calendar events. Because a number of users will typically use the same external data sources, the information from those sources is preferably only collected once (Block 220). The rule evaluation against these and other sources (Block 225) is then done for all users. This process is further detailed in FIG. 4. Once the rule evaluation for external sources is completed, the timer is restarted (Block 230) and the processing for this iteration of FIG. 2 is complete.

Figure 4:
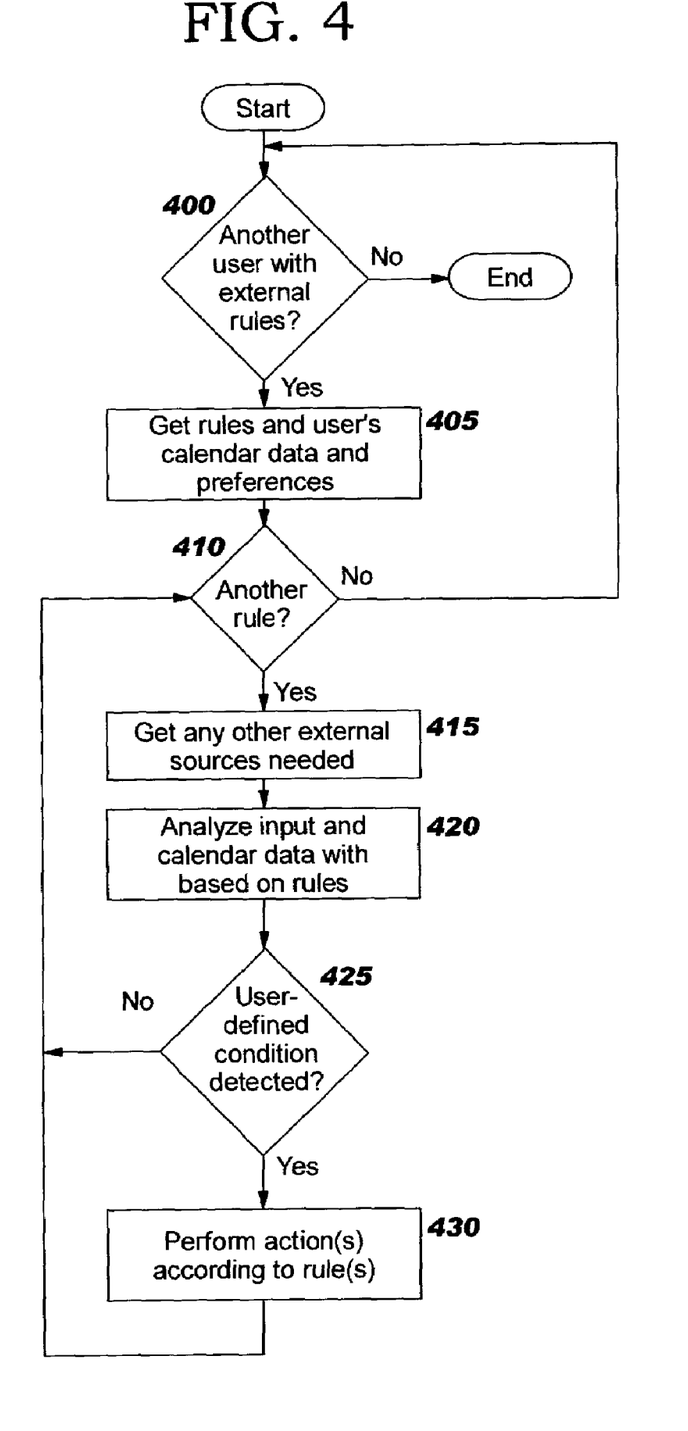

If the input is a notification from an external data source (Block 235), the process (Block 240) is the same as for processing all external sources in Block 225, and is shown in FIG. 4.

The next type of event is the user making an update to his rules (Block 245). When this happens, all future calendar events need to be evaluated against the new and existing rules (Block 250). This process is detailed in FIG. 5.

The final event is a calendar data update (Block 255). When this occurs, all rules need to be processed against the update (Block 260). This process is further detailed in FIG. 6.

Figure 3:
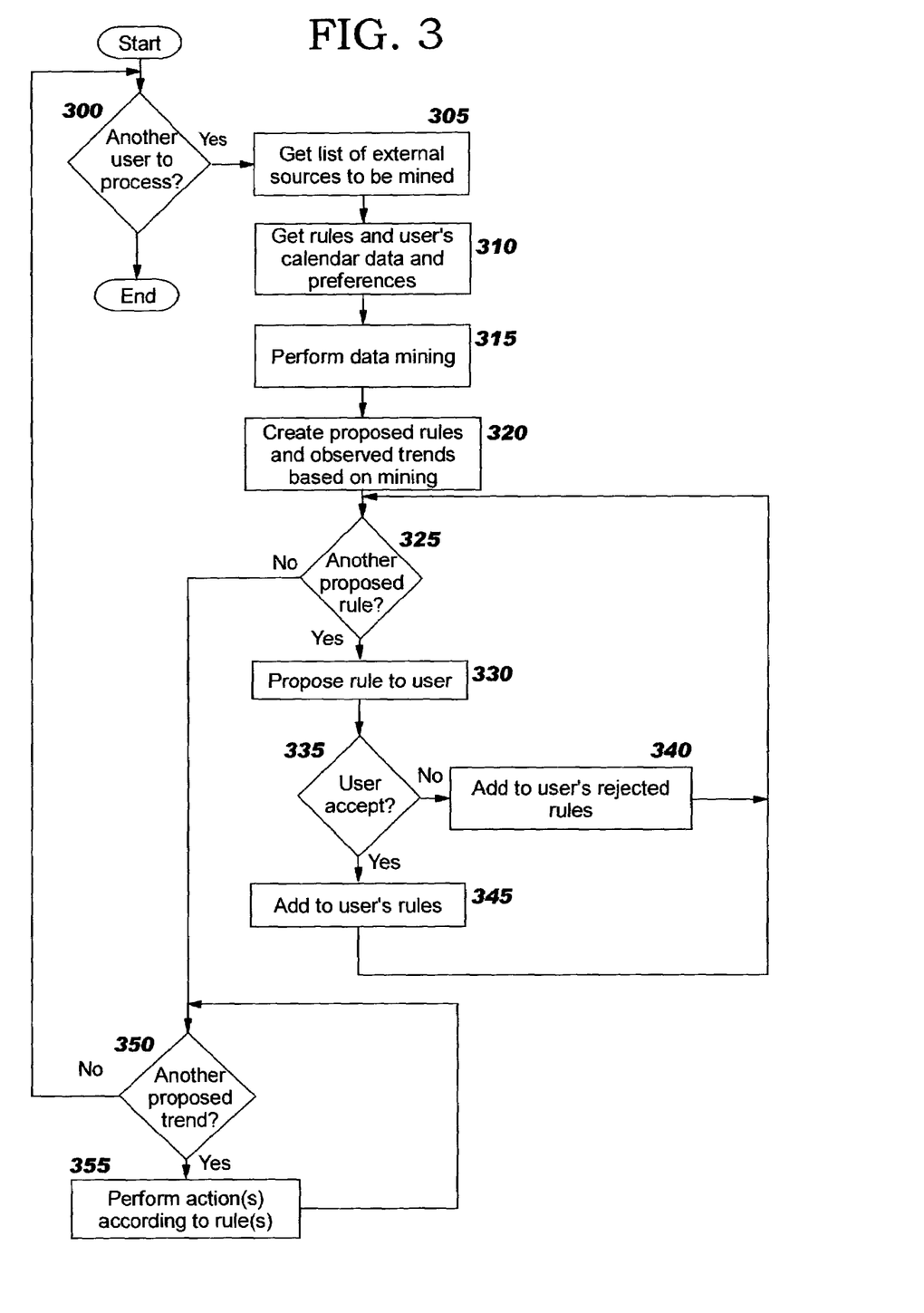

FIG. 3 depicts a preferred embodiment of the data mining process. At decision point 300, the process loops through all users for whom calendar data needs to be processed. For each individual, there is a set or list of external sources that are to be used. This list can be generated (Block 305) in several ways: there can be an explicit list of sources that the user identifies as her sources or the list can be implicitly defined by the sources referred to in the user's rules. These sources can include general information sources or another person's calendar. Given these sources and the user's historical calendar data, rules, rejected rules (discussed below with reference to Block 340), and preferences (obtained at Block 310), the data mining processing (Block 315) can be performed. Data mining of the type performed at Block 315 is well known in the prior art and any and all such techniques can be used. (As is well known in the art, data mining includes not only accessing data but analyzing the data, for example to search for trends.) The data mining produces both potential rules that the user might want to add to her rules list and trends that can be applied directly to future calendar data (Block 320).

For each of the rules that is discovered (a positive result at Block 325), it is preferably proposed to the user (Block 330). The user is then given the opportunity to accept or reject the rule (Block 335). If the rule is rejected (Block 340), it is preferably kept by the system so that it will not continue to be proposed. If it is accepted (Block 345), the rule is added to the list of user rules and is now treated as a new rule that needs to be applied to the user's calendar data (as discussed with reference to Block 245 of FIG. 2). When there are no additional rules to process (a negative result at Block 325), the identified trends are processed (Blocks 350 and 355). An example of a trend is a change in working hours that better reflects the user's actual behavior. For each such trend, the processing (Block 355) depends on the directions that the user has given. If the user has requested to be queried on trends, the user is consulted and the processing proceeds as requested. Such a validation can be performed with a range of techniques, including stopping processing to wait for a response, waiting for an asynchronous response, or setting a timer to prevent an indefinite wait on an asynchronous response. If, on the other hand, the user has indicated to simply apply or not apply trends (with or without conditions), that processing (i.e., updating calendar data and/or initiating a task) is done. If the processing updates a user's calendar data, the update is treated as a calendar data update (as discussed above with reference to Block 255 of FIG. 2) and processed accordingly.

FIG. 4 depicts logic that may be used for processing of data from external data sources, whether coming from a periodic processing of an external source (in response to a timer popping, for example, as discussed with reference to Block 225 of FIG. 2) or from a specific event notification (as discussed with reference to Block 240 of FIG. 2). The process handles each user in turn who has rules that depend on one or more external data sources (Block 400). For each such user, the process retrieves his calendar data, rules, and preferences (Block 405). The process handles each rule that uses an external source that is being processed (Block 410).

When Block 410 reaches the end of the rule processing for the current user, control returns to Block 400 to begin processing the next user (if any).

For each rule encountered at Block 410, the process retrieves other sources that might be needed (Block 415), for example, another person's calendar or an additional external source. The process then analyzes the external input and the calendar data based on the rules (Block 420). If a user-defined condition is detected (Block 425), the appropriate action is performed (Block 430). The actions include updating calendar data and/or initiating a task. Such actions may be an update to the user's calendar, in which case the calendar update will cascade and be processed at Block 255 of FIG. 2. If no user-defined condition is detected at Block 425, then control returns to Block 410 to determine whether there are more rules to be processed. Following completion of Block 430, control returns to Block 410.

Figure 5:
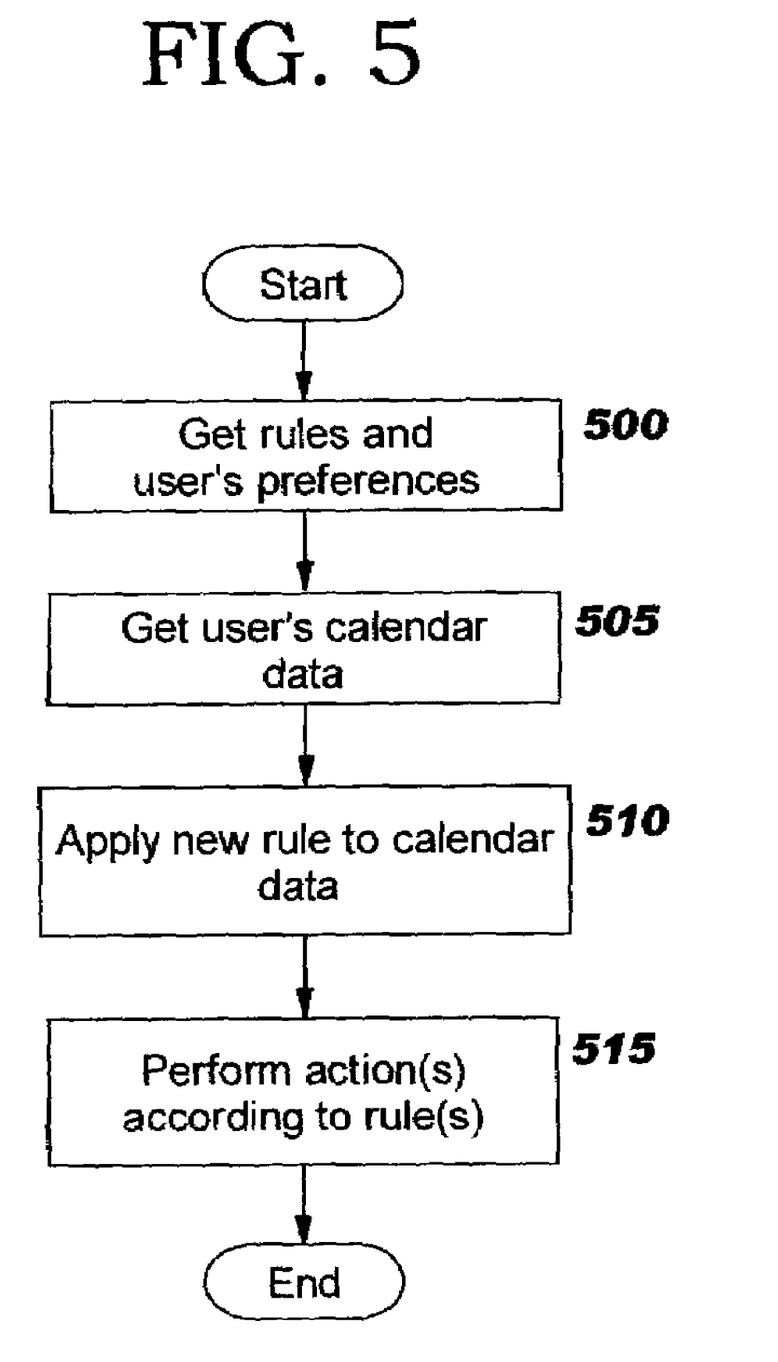

FIG. 5 depicts logic that may be used to implement the processing of an update to the rules. The process begins by retrieving the user's rules and preferences (Block 500) and then accesses the user's future calendar data (Block 505). The new rule is then applied to all calendar data (Block 510) and appropriate actions are performed (Block 515). As elsewhere, if these actions update calendar data, the processing of these new events will be processed at Block 255 of FIG. 2.

Figure 6:
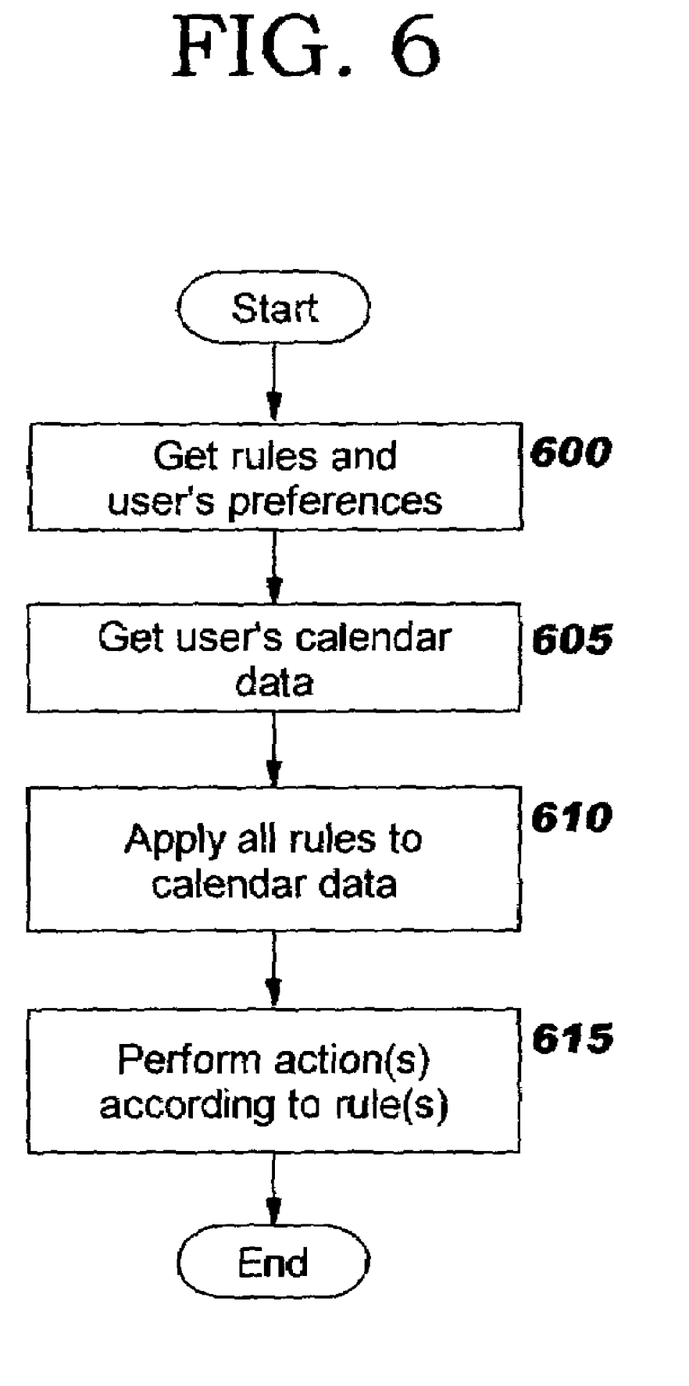

FIG. 6 depicts logic that may be used to implement the processing when a calendar event is updated. Block 600 gets the rules that are applicable to this user, along with any applicable preferences, and Block 605 obtains calendar data for the user for whom the update has been detected. Block 610 applies all applicable rules to the calendar data, and Block 615 performs any actions that are identified for the detected update, according to this user's rules. Again, any new calendar entries will be cascaded and fully processed at Block 255 of FIG. 2.

As has been demonstrated, the present invention discloses advantageous techniques for programmatically predicting and adjusting users' working hours and calendar events for electronic calendar systems. (The programmatic adjustments to working hours are particularly advantageous for users whose working hours are irregular.) When using the present invention, more accurate data will be reflected on users' calendars with less effort required of those users, enabling other individuals to more accurately determine where the calendar owner is and his availability at a point in time. Additionally, calendar-based tools (such as those disclosed in the related U.S. patents for responding to incoming events such as voice mail and for using calendar events to update status in other applications), vacation planners, and so forth will have more accurate calendar data with which to work.

As will be appreciated by one of skill in the art, embodiments of the present invention may be provided as methods, systems, or computer program products. Accordingly, the present invention may take the form of an entirely hardware embodiment, an entirely software embodiment, or an embodiment combining software and hardware aspects. Furthermore, the present invention may take the form of a computer program product which is embodied on one or more computer-readable storage media (including, but not limited to, disk storage, CD-ROM, optical storage, and so forth) having computer-readable program code embodied therein.

The present invention has been described with reference to flowchart illustrations and/or flow diagrams of methods, apparatus (systems), and computer program products according to embodiments of the invention. It will be understood that each block of the flowchart illustrations and/or flow diagrams, and combinations of blocks in the flowchart illustrations and/or flows in the flow diagrams, can be implemented by computer program instructions. These computer program instructions may be provided to a processor of a general purpose computer, special purpose computer, embedded processor, or other programmable data processing apparatus to produce a machine, such that the instructions, which execute via the processor of the computer or other programmable data processing apparatus, create means for implementing the functions specified in the flowchart and/or flow diagram block(s) or flow(s).

These computer program instructions may also be stored in a computer-readable memory that can direct a computer or other programmable data processing apparatus to function in a particular manner, such that the instructions stored in the computer-readable memory produce an article of manufacture including instruction means which implement the function specified in the flowchart and/or flow diagram block(s) or flow(s).

The computer program instructions may also be loaded onto a computer or other programmable data processing apparatus to cause a series of operational steps to be performed on the computer or other programmable apparatus to produce a computer-implemented process such that the instructions which execute on the computer or other programmable apparatus provide steps for implementing the functions specified in the flowchart and/or flow diagram block(s) or flow(s). Furthermore, the instructions may be executed by more than one computer or data processing apparatus.

While preferred embodiments of the present invention have been described, additional variations and modifications in those embodiments may occur to those skilled in the art once they learn of the basic inventive concepts. Therefore, it is intended that the appended claims shall be construed to include all such variations and modifications as fall within the spirit and scope of the invention.

What is claimed:

1. A method of programmatically adjusting working hours for electronic calendars, comprising steps of:
   analyzing historical calendar data for a calendar user to determine patterns in the user's historical working hours, wherein the analyzing further comprises comparing the user's historical scheduled working hours to his historical actual working hours;
   using the determined patterns to programmatically predict the user's future working hours, wherein the determined patterns comprise discrepancies between the historical scheduled working hours and the historical actual working hours; and
   automatically programmatically adjusting the user's scheduled working hours for an electronic calendar of the user, for at least one future date, based on the predicted future working hours, wherein the programmatic adjustments comprise at least one of: adding scheduled working hours to the user's electronic calendar; deleting scheduled working hours from the user's electronic calendar; or changing scheduled working hours on the user's electronic calendar.

2. The method according to claim 1, wherein rules are used in at least one of the analyzing, using, and programmatically adjusting steps.

3. The method according to claim 1, further comprising the step of enabling the user to confirm the predicted future working hours and wherein the programmatic adjustments are only made if the user confirms them.

4. A method of programmatically adjusting calendar events on electronic calendars, comprising steps of:

analyzing historical calendar data for a calendar user to determine patterns in the user's historical calendar events, wherein the analyzing further comprises comparing the calendar user's historical scheduled calendar events to his historical actual calendar events;

using the determined patterns to programmatically predict at least one future calendar event for the user, wherein the determined patterns comprise discrepancies between the historical scheduled calendar events and the historical actual calendar events; and programmatically adjusting at least one of the user's scheduled calendar events on an electronic calendar of the user, based on the predicted at least one future calendar event, wherein the at least one programmatic adjustment comprises at least one of: adding a newly-scheduled calendar event to the user's electronic calendar; deleting an already-scheduled calendar event from the user's electronic calendar; or changing an already-scheduled event on the user's electronic calendar.

5. The method according to claim 4, wherein rules are used in at least one of the analyzing, using, and programmatically adjusting steps.

6. The method according to claim 4, further comprising the step of enabling the user to confirm each of the at least one predicted programmatic adjustments, and wherein the programmatic adjustments are only made if the user confirms them.

7. A system for programmatically adjusting working hours for electronic calendars, comprising:

stored historical calendar data comprising historical working hours for a user of an electronic calendar;

means for analyzing the stored historical calendar data for the user to determine patterns in the user's historical working hours, wherein the analyzing further comprises comparing the user's historical scheduled working hours to his historical actual working hours;

means for using the determined patterns to programmatically predict the user's future working hours, wherein the determined patterns comprise discrepancies between the historical scheduled working hours and the historical actual working hours; and means for automatically programmatically adjusting the user's scheduled working hours for the electronic calendar of the user, for at least one future date, based on the predicted future working hours, wherein the programmatic adjustments comprise at least one of: adding scheduled working hours to the user's electronic calendar; deleting scheduled working hours from the user's electronic calendar; or changing scheduled working hours on the user's electronic calendar.

8. A computer program product for programmatically adjusting working hours for electronic calendars, the computer program product embodied on one or more computer-readable media and comprising computer-readable program code for:

analyzing historical calendar data for a calendar user to determine patterns in the user's historical working hours, wherein the analyzing further comprises comparing the user's historical scheduled working hours to his historical actual working hours;

using the determined patterns to programmatically predict the user's future working hours, wherein the determined patterns comprise discrepancies between the historical scheduled working hours and the historical actual working hours; and automatically programmatically adjusting the user's scheduled working hours for an electronic calendar of the user, for at least one future date, based on the predicted future working hours, wherein the programmatic adjustments comprise at least one of: adding scheduled working hours to the user's electronic calendar; deleting scheduled working hours from the user's electronic calendar; or changing scheduled working hours on the user's electronic calendar.

9. A system for programmatically adjusting electronic calendars, comprising:

stored historical calendar data comprising historical calendar events for a user of an electronic calendar;

means for analyzing the stored historical calendar data for the user to determine at least one pattern in the user's historical calendar events, wherein the analyzing further comprises comparing the calendar user's historical scheduled calendar events to his historical actual calendar events;

means for using the determined at least one pattern to programmatically predict at least one future calendar event for the user, wherein the determined patterns comprise discrepancies between the historical scheduled calendar events and the historical actual calendar events; and means for programmatically adjusting at one of the user's scheduled calendar events on the electronic calendar of the user, based on the predicted at least one future calendar event, wherein the at least one programmatic adjustment comprises at least one of: adding a newly-scheduled calendar event to the user's electronic calendar; deleting an already-scheduled calendar event from the user's electronic calendar; or changing an already-scheduled event on the user's electronic calendar.

10. A computer program product for programmatically adjusting electronic calendars, the computer program embodied on one or more computer-readable media and comprising computer-readable program code for:

analyzing historical calendar data for a calendar user to determine at least one pattern in the user's historical calendar events, wherein the analyzing further comprises comparing the calendar user's historical scheduled calendar events to his historical actual calendar events;

using the determined at least one pattern to programmatically predict at least one future calendar event for the user, wherein the determined patterns comprise discrepancies between the historical scheduled calendar events and the historical actual calendar events; and programmatically adjusting at least one of the user's scheduled calendar events on an electronic calendar of the user, based on the predicted at least one future calendar event, wherein the at least one programmatic adjustment comprises at least one of: adding a newly-scheduled calendar event to the user'electronic calendar; deleting an already-scheduled calendar event from the user's electronic calendar; or changing an already-scheduled event on the user's electronic calendar.

* * * * *